(12) United States Patent
Junkers

(10) Patent No.: US 6,254,323 B1
(45) Date of Patent: *Jul. 3, 2001

(54) BOLT FOR CONNECTING TWO PARTS WITH ONE ANOTHER, AND FASTENING DEVICE PROVIDED WITH THE BOLT

(76) Inventor: John K. Junkers, 7 Arrowhead La., Saddle River, NJ (US) 07540

( * ) Notice: Subject to any disclaimer, the term of this patent is extended or adjusted under 35 U.S.C. 154(b) by 0 days.

This patent is subject to a terminal disclaimer.

(21) Appl. No.: 09/425,331

(22) Filed: Oct. 22, 1999

(51) Int. Cl.⁷ ............................. F16B 37/08; F16B 31/00
(52) U.S. Cl. ..................... 411/14.5; 411/916; 411/397; 254/29 A
(58) Field of Search .................................. 411/14.5, 916, 411/917, 534, 432, 428, 397; 254/29 A; 81/55, 56, 57.38

(56) References Cited

U.S. PATENT DOCUMENTS

| | | | | |
|---|---|---|---|---|
| 1,227,877 | * | 5/1917 | Brisbin ................................ | 81/55 |
| 3,916,734 | * | 11/1975 | Sawan ................................ | 81/56 |
| 5,499,558 | * | 3/1996 | Junkers .............................. | 245/29 A |
| 5,539,970 | * | 7/1996 | Junkers .............................. | 81/57.38 |
| 5,609,454 | * | 3/1997 | Lee . | |
| 5,640,749 | | 6/1997 | Junkers . | |
| 5,946,789 | * | 9/1999 | Junkers .............................. | 81/57.38 |

FOREIGN PATENT DOCUMENTS

| | | |
|---|---|---|
| 44 05 974 | 5/1995 | (DE) . |
| 0 940 590 | 9/1999 | (EP) . |
| 351090 * | 8/1937 | (IT) . |

* cited by examiner

Primary Examiner—Flemming Saether
(74) Attorney, Agent, or Firm—Michael J. Striker

(57) ABSTRACT

A bolt for connecting two parts with one another has a bolt member having an axis, a threaded portion provided with a thread, and another portion having a polygonal circumference, a friction washer non-rotatably connected to the polygonal circumference of the other portion of the bolt member and having a first facial area adapted to abut against a facial area of one of the two parts and also having an opposite second facial area, a sleeve connected to the thread of the threaded portion of the bolt member and having a facial area abutting against the second facial area of the friction member, means provided on the sleeve for applying a given force, and means provided on one of the bolt member and the friction washer so as to apply a given force in an opposite direction to the sleeve, so that when a given force is applied in one direction to at least one of the bolt member and the friction washer through the means on the at least one bolt member and the washer and a given force is applied in an opposite direction to the sleeve through the means of the sleeve, only the sleeve turns while the bolt member does not turn and only is elongated or relaxed.

4 Claims, 4 Drawing Sheets

BOLT FOR CONNECTING TWO PARTS WITH ONE ANOTHER, AND FASTENING DEVICE PROVIDED WITH THE BOLT

BACKGROUND OF THE INVENTION

The present invention relates generally to threaded connectors for connecting two parts with one another, such as bolts and the like. The present invention also relates to a fastening device provided with the bolt.

Threaded connectors of this type are known in the art. Some known threaded connectors are formed as threaded bolts with or without a head, and with or without a nut. One of the threaded connectors is disclosed for example in my U.S. Pat. No. 5,318,397 as well as in my other patents. The bolts or threaded connectors can be further improved.

SUMMARY OF THE INVENTION

Accordingly, it is an object of present invention to provide a new bolt which is a further improvement of the existing bolts, as well as a fastening device provided with it.

In keeping with these objects and with others which will become apparent hereinafter, one feature of present invention resides, briefly stated, in a bolt having an axis and used to connect two parts with one another, which has a threaded portion on one of its ends, and another portion axially spaced from the threaded portion and having a polygonal circumference, a friction washer connectable to the polygonal circumference and adapted to rest with a first facial area on one facial area of one of the parts to be connected, and a sleeve connectable to a thread of the threaded portion and abutting with one of its facial areas against a second facial area of the friction washer, so that when a force in one direction is applied to the bolt and a force in an opposite direction is applied to the sleeve, only the sleeve turns while the bolt is elongated or relaxed.

When the bolt is designed in accordance with the present invention, it has a simple construction and can be elongated and relaxed when needed.

In accordance with another feature of the present invention, a fastening device is provided which includes the inventive bolt and a tool cooperating with it.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
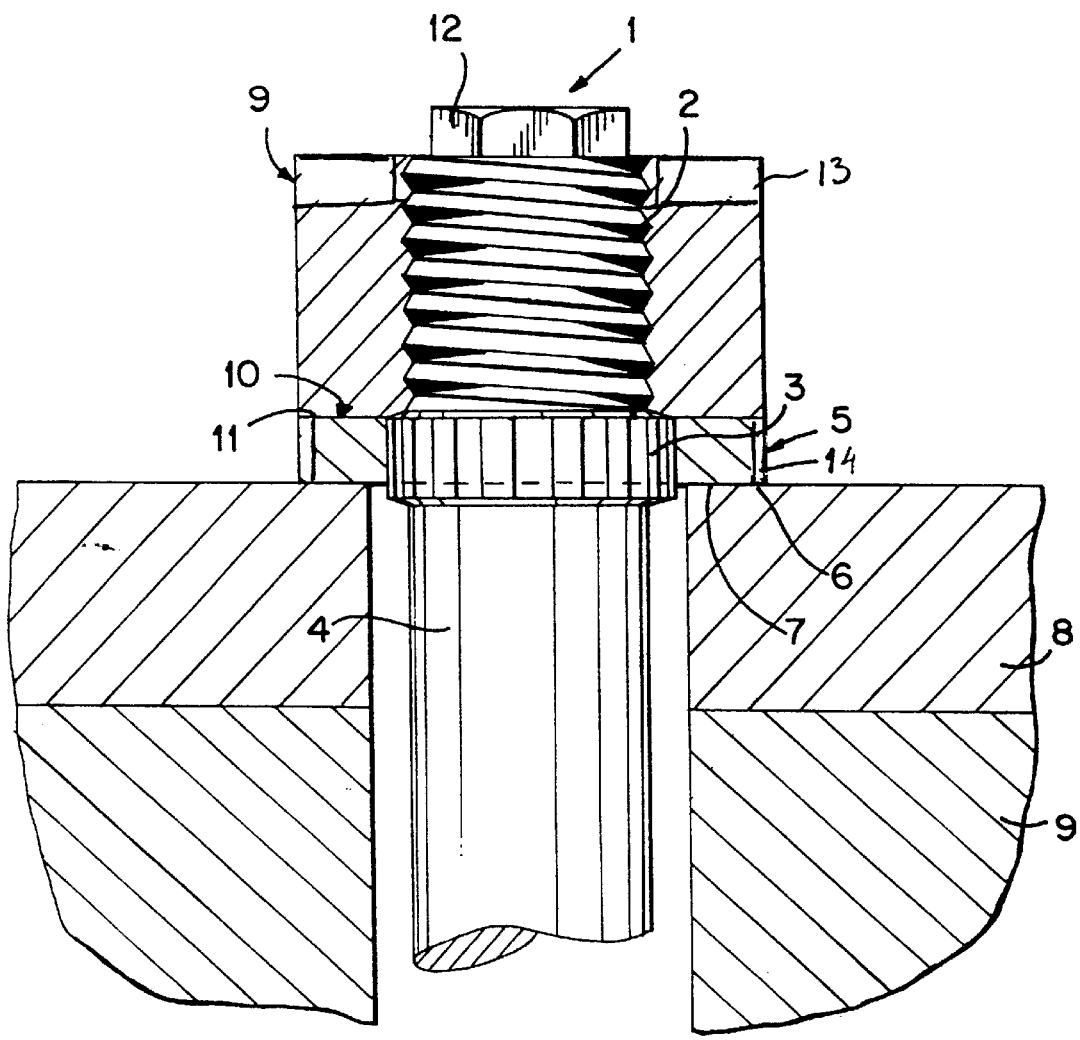
FIG. 1 of the drawing is a view showing a bolt for connecting two parts with one another in accordance with the present invention.

A bolt in accordance with present invention has a bolt member which is identified as a whole with reference numeral 1 and has an axis. The bolt member 1 has a polygonal head 12 at one end. It also has a threaded portion 2 extending from the one end of the bolt member and provided with a thread. The bolt member 1 further has another portion which is identified with reference numeral 3 and has a polygonal circumference. The polygonal circumference bolt portion 3 is axially spaced from the threaded bolt portion 2. Finally, the bolt member 1 has a shaft portion 4 which can be provided with a not shown head on an opposite side. The polygonal circumference of the bolt portion 4 can be formed by a plurality of splines which extend in the axial direction of the bolt member and are circumferentially spaced from one another in a peripheral direction of the bolt member 1.

The bolt further has a friction washer which is identified as a whole with reference numeral 5. The friction washer has a first facial area 6 which abuts against a facial area 7 of one of the parts to be connected with one another. The parts to be connected with one another are identified with reference numerals 8 and 9. The friction washer 5 is connectable with the polygonal circumference of the bolt portion 3. In particular, the friction washer 5 has an inner surface having a shape corresponding to the shape of the outer surface of the bolt portion 3. In the shown embodiment, the inner surface of the friction washer 5 is provided with a plurality of formations which are circumferentially distributed and formed as splines which correspond to the splines of the bolt portion 3 and engage with these splines. Therefore, the bolt member 1 can not rotate relative to the friction washer 5, but can displace in an axial direction relative to the friction washer 5. The friction washer 5 also has an outer surface provided with engaging means formed for example by a plurality of circumferentially distributed formations 14 such as splines and the like.

The bolt further has a sleeve which is identified with reference numeral 9. The sleeve 9 has a facial area 10 which abuts against an opposite facial area 11 of the friction washer 5. The sleeve 9 is connected with the thread of the threaded portion 2 of the bolt member 1. In particular, the sleeve 9 is provided with an inner thread which corresponds to the outer thread of the threaded portion 2 of the bolt member 1, so as to engage the outer thread of the bolt portion 2. The sleeve is also provided with engaging means formed for example by a plurality of castellations 13.

Figure 2:
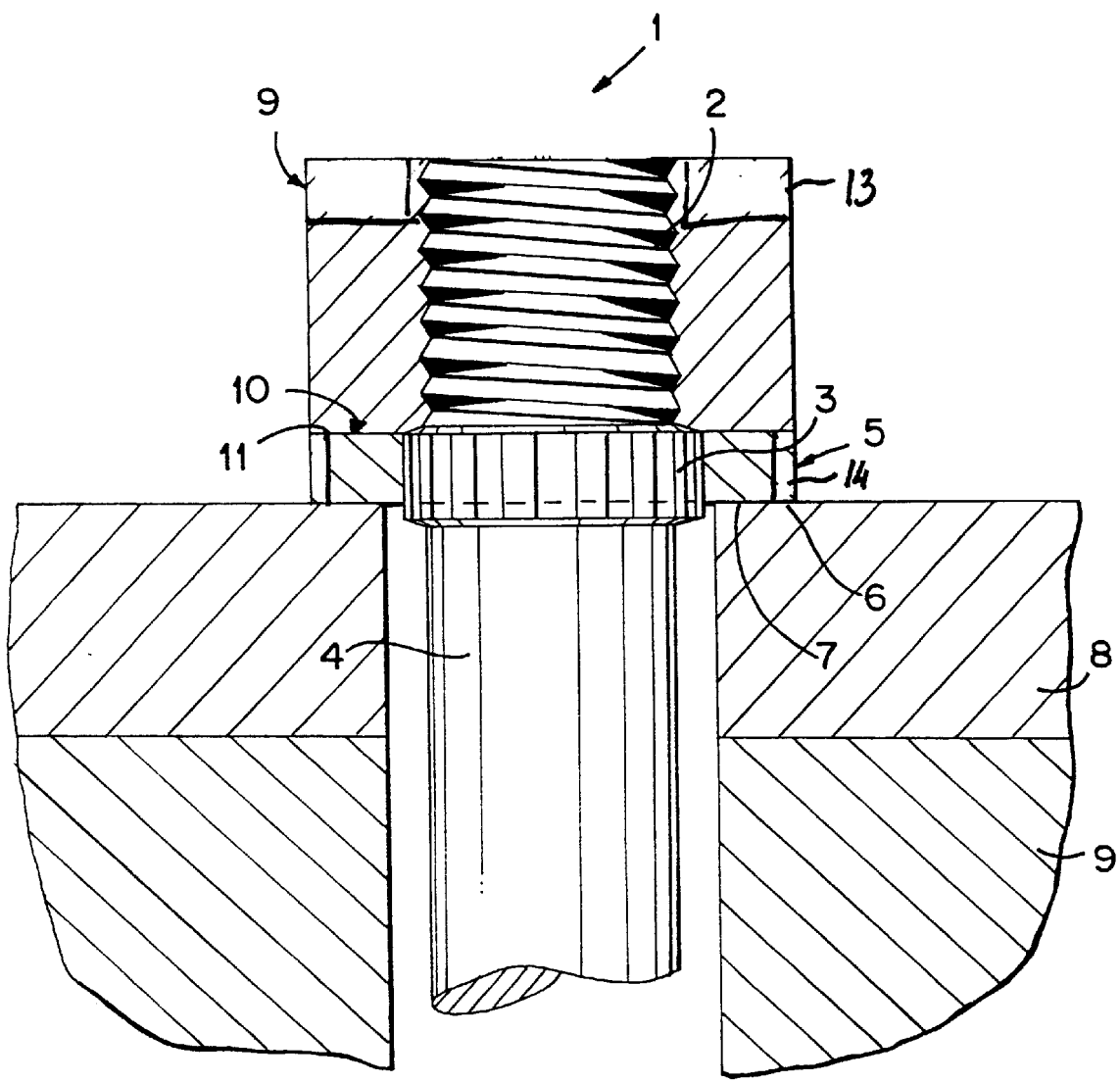
FIG. 2 is a view showing the inventive bolt in accordance with another embodiment of the present invention.
Figure 3:
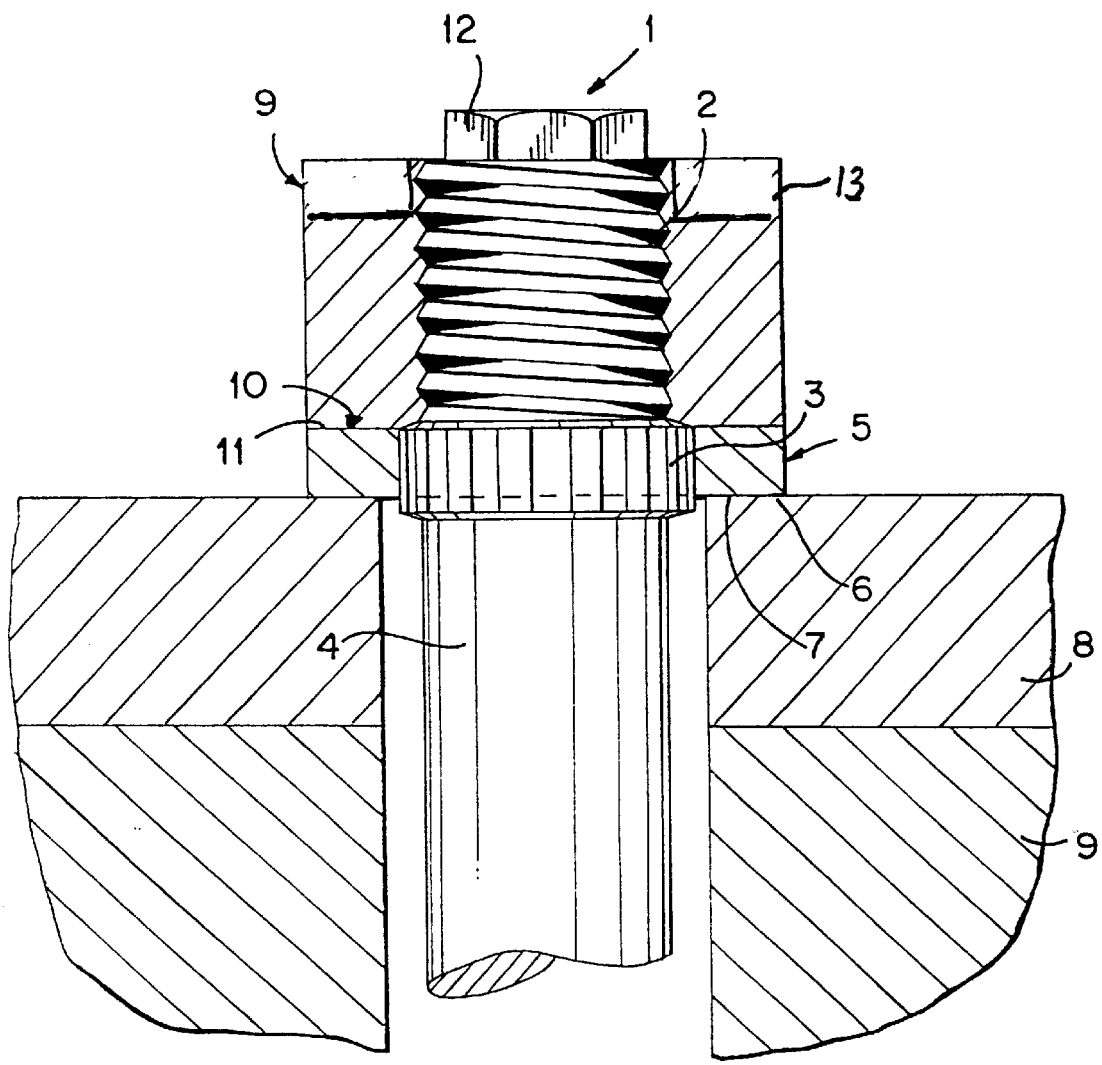
FIG. 3 is a view showing the inventive bolt in accordance with still a further embodiment of the present invention.

FIGS. 2 and 3 show the bolt in accordance with two further embodiments of the present invention. In the bolt in accordance with the embodiment shown in FIG. 2, the bolt member 1 does not have engaging means or in other words the bolt head 12. The sleeve 9 and the washer 5 however have the engaging means. The engaging means in the sleeve 9 are formed by a plurality of castellations 13 on its upper end, while the engaging means in the washer 5 are formed by a plurality of splines 14.

In the embodiment shown in FIG. 3 the washer 5 does not have engaging means, but instead the engaging means are provided on the bolt member 1 and the sleeve 9. The engaging means of the bolt member 1 are formed as the polygonal head 12, and the engaging means on the sleeve 9 are formed by a plurality of castellations 13 on its upper end.

In the bolt in accordance with the embodiment shown in FIG. 2, when a given force is applied in a one direction to the bolt member 1 by engaging the washer 5 through the splines 14 by a tool and the given force is applied in an opposite direction to the sleeve 9 through the castellations 13 by the tool, only the sleeve 9 turns while the bolt member 1 is elongated or relaxed. The reason is that the sleeve 9 is subjected only to the friction in the thread and on its facial area 10, while the bolt member 1 is subjected to the frictions in the thread, on the facial area 11 of the washer 5 which is non rotatably connected with the bolt member 1, on the facial area 7 of the washer 5, and on the other end of the bolt member 1 on which a bolt head can be provided or which can be fixed in the part 9. Since the bolt member 1 is subjected to substantially higher friction than the sleeve 9, therefore when the sleeve 9 is turned, the bolt member 1 does not turn and is only elongated or relaxed.

In the embodiment of FIG. 3 when the given force is applied in one direction to the bolt member 1 through the bolt head 12 and a given force is applied in an opposite direction to the sleeve 9 through the castellations 13, only the sleeve 9 turns while the bolt member does not turn and is only elongated or relaxed. The reasons are the same which were explained with respect to the embodiment to FIG. 2, in particular because the friction applied the bolt member 1 is substantially higher than the friction applied to the sleeve 9.

In the embodiment of FIG. 1, the bolt member 1 has the engaging means 12, the sleeve 9 also has the engaging means 13, and the washer 5 has further engaging means 14. The bolt shown in FIG. 1 can operate alternatingly either by application of the forces to the sleeve 9 through the engaging means 13 and to the bolt member 1 through the engaging means 12, or by application of the forces to the sleeve 9 through engaging means 13 and to the washer 5 through the engaging means 14.

The forces which are applied to the bolt in accordance with the present invention can be an active force applied to the sleeve 9 and intended to rotate the sleeve 9 in a circumferential direction and an opposite holding force applied in an opposite direction to the bolt member 1 or to the washer 5. On the other hand, the active force can be applied to the bolt member 1 or to the washer 5, while the holding force can be applied to the spring 9.

Figure 4:
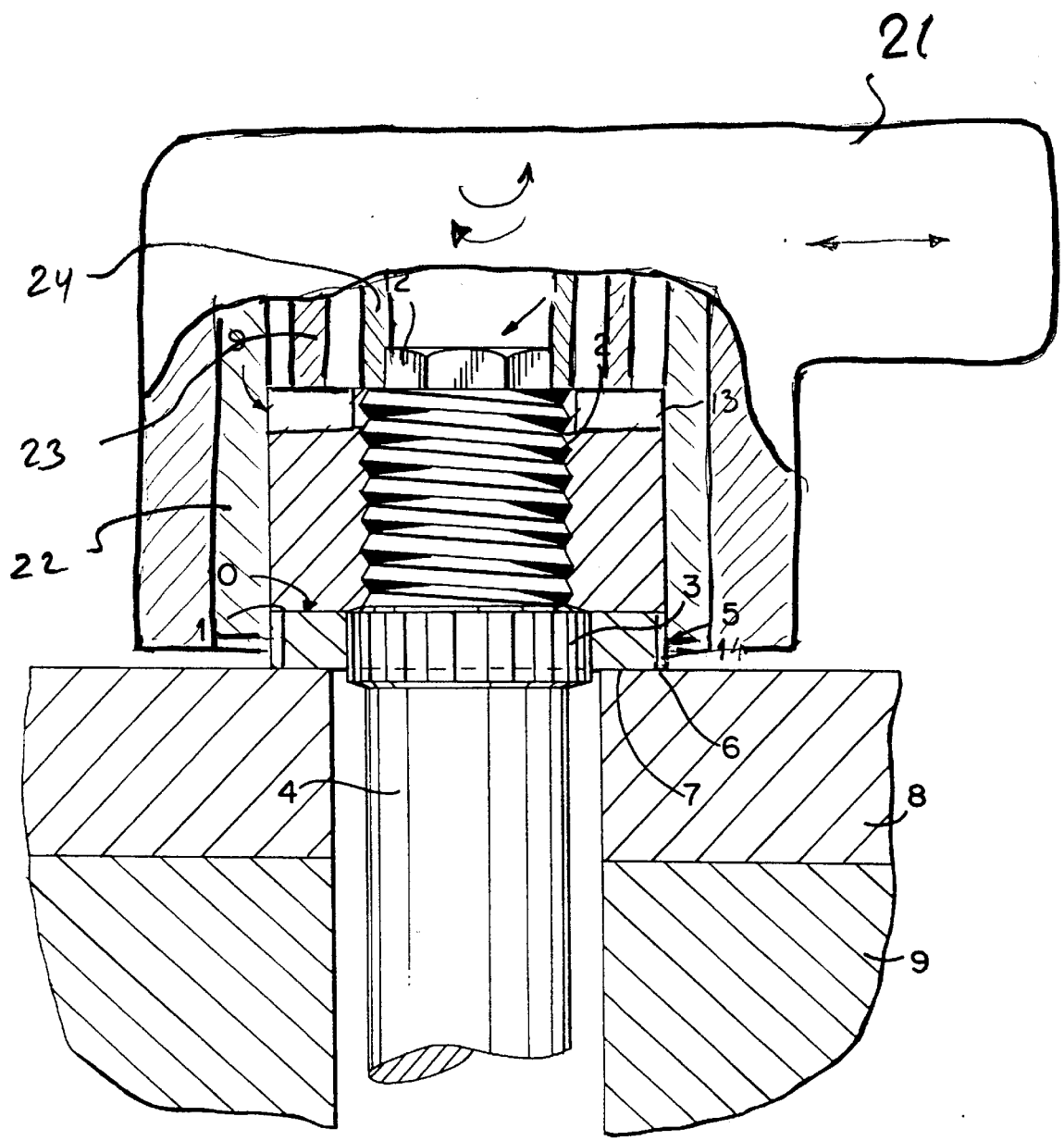
FIG. 4 is a view showing a fastening device provided with the bolt in accordance with the present invention.

FIG. 4 shows a complete fastening device in accordance with the present invention. In addition to the bolt as described herein above, it also has a torque tool identified as a whole with reference numeral 21. The torque tool 21 has a not shown drive, formed for example as a fluid operated drive with a reciprocating piston having a piston rod, and a driven part which includes for example a ratchet mechanism connected with the reciprocating rod of the drive. The tool 21 is further provided with a plurality of driving tool elements which are identified with reference numeral 22, 23, and 24. The driving tool element 22 is formed for example as a socket for engaging the splines 14 of the washer 5, and for this purpose can be provided with corresponding countersplines. The driving tool element 23 is provided for engagement with the castellations 13 of the sleeve 9 and for this purpose can be formed as a ring provided with lower projections engaging in the gaps between the castellations. Finally, the driving tool element 24 is provided for engagement with the bolt head 12 of the bolt member and can be formed as a socket having an inner hexagonal opening corresponding to the hexagonal shape of the bolt head 12.

The corresponding driving element 22, 23, 24 can be activated alternatingly and selectively by a user. For example, for the bolt shown in FIG. 2, the driving elements 22 and 23 can engage the washer 5 and the sleeve 9 and to apply corresponding forces to them. In the embodiment of FIG. 3 the driving elements 23 and 24 can apply corresponding forces to the sleeve 9 and to the bolt member 1. In the embodiment of FIG. 1, as mentioned hereinabove, selectively either the washer 5 and the sleeve 9 can be engaged by the driving elements 22, 23, or the sleeve 9 and the bolt member 1 can be engaged by the driving elements 23 and 24 and thereby corresponding forces are applied.

The torque tool 21 is a single tool which on the one hand provides the active force and on the other hand provides the opposite holding force, or provides two opposite active forces.

It will be understood that each of the elements described above, or two or more together, may also find a useful application in other types of constructions differing from the types described above.

While the invention has been illustrated and described as embodied in bolt, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A bolt for connecting two parts with one another, comprising a unitary one-piece bolt member having an axis and two axial ends, a threaded portion provided with a thread, and another portion having a polygonal circumference; a friction washer non-rotatably connected to said polygonal circumference of said other portion of said bolt member and having a substantially flat first facial area adapted to relatively rotatably abut against a facial area of one of the parts so as not to damage the facial area of the one part and also having an opposite second facial area; a sleeve arranged in a region of one of said axial ends of said bolt member said sleeve being connected to said thread of said threaded portion of said bolt member and having a facial area abutting against said second facial area of said friction washer; first means provided on said sleeve for applying a given force; and second means provided on at least one element selected from the group consisting of said bolt member in the region of said one axial end of said bolt member, and said friction washer so as to apply a given force in an opposite direction to said sleeve, so that when a given force is applied in one direction to at least one of said bolt member and said friction washer through said means on said at least one bolt member and said washer and a given force is applied in an opposite direction to said sleeve in the region of said one axial end of said bolt member, through said first means of said sleeve, only said sleeve turns while said bolt member does not turn and only is elongated or relaxed.

2. A bolt as defined in claim 1; and further comprising means for connecting said bolt member with said friction washer and including a plurality of circumferentially distributed formations.

3. A bolt as defined in claim 1, wherein said both said bolt member and said friction washer are provided with means for applying a given force.

4. A fastening device for connecting two parts with one another, comprising a unitary one-piece bolt including a bolt member having an axis and two axial ends, a threaded portion provided with a thread, and another portion having a polygonal circumference; a friction washer non-rotatably connected to said polygonal circumference of said other portion of said bolt member and having a substantially flat first facial area adapted to relatively rotatably abut against a facial area of one of the parts so as not to damage the facial area of the one part and also having an opposite second facial area; a sleeve arranged in a region of one of said axial ends of said bolt member, said sleeve being connected to said thread of said threaded portion of said bolt member and having a facial area abutting against said second facial area of said friction washer; first means provided on said sleeve for applying a given force; and second means provided on at least one element selected from the group consisting of said bolt member in the region of said one axial end of said bolt member, and said friction washer so as to apply a given force in an opposite direction to said sleeve, so that when a given force is applied in one direction to at least one of said bolt member in the region of said one axial end of said bolt member, and said friction washer through said second means on said at least one bolt member in the region of said one axial end of said bolt member, and said washer and a given force is applied in an opposite direction to said sleeve in the region of said one axial end of said bolt member, through said first means of said sleeve, only said sleeve turns while said bolt member does not turn and only is elongated or relaxed, and a single torque tool including driving means for simultaneously applying the given force to one of said bolt member and said washer and the given force to said sleeve.

* * * * *